US006436861B1

(12) United States Patent
Suzuki et al.

(10) Patent No.: US 6,436,861 B1
(45) Date of Patent: Aug. 20, 2002

(54) CALCIUM ZIRCONATE/MAGNESIA POROUS COMPOSITES AND THEIR FABRICATION PROCESS

(75) Inventors: Yoshikazu Suzuki; Tatsuki Ohji, both of Aichi (JP); Peter E. D. Morgan, Thousand Oaks, CA (US)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 79 days.

(21) Appl. No.: 09/695,095

(22) Filed: Oct. 25, 2000

(30) Foreign Application Priority Data

Oct. 27, 1999 (JP) .......................................... 11-304816

(51) Int. Cl.$^7$ .............................................. C04B 38/00
(52) U.S. Cl. ........................... 501/80; 501/84; 501/102; 501/104; 501/121; 501/123; 501/135
(58) Field of Search .................. 501/80, 84, 102, 501/104, 108, 121, 123, 135

(56) References Cited

U.S. PATENT DOCUMENTS 5,087,278 A * 2/1992 Suzuki

FOREIGN PATENT DOCUMENTS

SU 833859 A * 5/1981

OTHER PUBLICATIONS

Yoshikazu Suzuki, et al., "Manufacturing Nano–Diphasic Materials from Natural Dolomite: In Situ Observation of Nanophase Formation Behavior", J. Am. Ceram. Soc., 80 [11], (1997), pp. 2949–2953.

* cited by examiner

Primary Examiner—David Sample
(74) Attorney, Agent, or Firm—Oblon, Spivak, McClelland, Maier & Neustadt, P.C.

(57) ABSTRACT

The present invention relates to porous calcium zirconate/magnesia composites having a thermally and chemically stable porous structure, which consist of sintered compacts having a fine composite structure stable under high temperatures due to uniformly dispersed equimolar amounts of calcium zirconate [CazrO$_3$] and magnesia [MgO] and controlled grain growth, and a method of producing the same, and the present porous composites are useful as, for instance, a functional material for filtering highly corrosion resistant materials, lightening members used at super-high temperatures, catalyst carriers, insulation or sound-absorbing materials, and the like.

6 Claims, 4 Drawing Sheets

CALCIUM ZIRCONATE/MAGNESIA POROUS COMPOSITES AND THEIR FABRICATION PROCESS

BACKGROUND OF THE INVENTION

1. Field of the Invention

The present invention relates to porous calcium zirconate/magnesia composites, and a method of producing the same, and in particular, relates to porous calcium zirconate/magnesia composites having a fine composite structure due to uniformly dispersed equimolar amounts of calcium zirconate [$CaZrO_3$] and magnesia [$MgO$] and controlled grain growth, and a method of producing the same.

Porous $CaZrO_3$/$MgO$ composites with a uniform three-dimensional (3-D) network structure have been successfully synthesized using reactive sintering of highly-pure mixtures of natural dolomite, ($CaMg(CO_3)_2$), and synthesized zirconia powders with LiF additive. Equimolar dolomite and zirconia powders doped with 0.5 wt % LiF were cold isostatically pressed at 200 MPa and sintered at 1100–1400° C. for 2 h in air. Through the liquid formation via LiF doping, strong necks were formed between constituent particles before completion of the pyrolysis of dolomite, resulting in the formation of a 3-D network structure. During and after the formation of network structure, $CO_2$ was given off to form a homogeneous open-pore structure. The pore-size distribution was very narrow (with pore size: ~1 μm), and the porosity was controllable (e.g. ~30–50%) by changing the sintering temperature. The porous composites can be applied as filter materials with good structural stability at high temperatures.

The porous composites of the present invention are useful as highly corrosion-resistant materials that function as fluid-permeable filters, lightweight members used at super-high temperatures, catalyst carriers, insulation, sound-absorbing materials, and the like.

2. Description of the Related Art

Porous ceramics having a high porosity made of oxides are used as conventional fluid-permeable filters, and the like. The conventional products are those in which pores are dispersed throughout a sintered compact by lowering the molding density and sintering temperature (controlled sintering), those in which pores are made by burning an organic binder (organic binder removal method), those in which uniform pores are made at a relatively low temperature using chemical means, such as alkoxide decomposition and reaction, etc. (sol gel method), and the like. Moreover, most of the porous products made by any of these production methods are single-phase porous compacts made from one ceramic.

However, these products have the following disadvantages: in conventional porous compact materials made by the controlled sintering method, bond strength between the crystal particles themselves that comprise the porous compact is insufficient and material strength of the porous compact overall is also insufficient, and because pore diameter distribution is wide, fluid selectivity is insufficient. There is a problem with porous compacts made by the organic binder removal method in that harmful gases such as $NO_x$, and the like are generated corresponding to the components of the polymer when it is burned. Moreover, there is a problem in that it is difficult to control microstructure of the porous compact because heat is generated when the polymer is burned. In addition, although it is possible to control structure to a relatively high degree with porous compact materials made by chemical means, beginning with the sol gel method, high cost is required and therefore, there are problems in terms of mass production. Furthermore, there is a disadvantage with porous compact materials made by any of these production methods in that when they are used at high temperatures of 1,000° C. or higher, sintering of the porous compact proceeds and structure thereof becomes coarser and pore diameter of the porous compact changes with time and as a result, properties thereof deteriorate.

Under these conditions, in light of the above-mentioned related art, the inventors have repeatedly performed intense research in order to develop new porous compact materials with which the above-mentioned problems can be solved, and successfully have completed the present invention upon developing porous calcium zirconate/magnesia composites having superior properties.

That is, the present invention provides porous calcium zirconate/magnesia composites whose structure is controlled to a high degree and which further have excellent heat resistance and corrosion resistance, and a method of producing these porous materials using a process that is advantageous in terms of cost in order to solve the above-mentioned disadvantages.

SUMMARY OF THE INVENTION

The present invention provides porous calcium zirconate/magnesia composites, and a method of producing the same.

The present invention relates to porous calcium zirconate/magnesia composites having a thermally and chemically stable porous structure, which consist of sintered compacts having a fine composite structure stable under high temperatures due to uniformly dispersed equimolar amounts of calcium zirconate [$CaZrO_3$] and magnesia [$MgO$] and controlled grain growth, and also relates to a method of producing the same.

The present porous composites are useful as, for instance, highly corrosion resistant materials that function as fluid-permeable filters, lightweight members used at super-high temperatures, catalyst carriers, insulation, or sound-absorbing materials, and the like.

The present invention for solving the above-mentioned problems consists of the following technical means:

(1) Porous calcium zirconate/magnesia composites having a thermally and chemically stable porous structure,
said porous composites consist of sintered compacts having a fine composite structure stable under high temperatures due to uniformly dispersed equimolar amounts of calcium zirconate [$CaZrO_3$] and magnesia [$MgO$] and controlled grain growth,
which are synthesized by using reactive sintering of equimolar mixture of dolomite and zirconia powders doped with liquid phase forming material.

(2) Porous calcium zirconate/magnesia composites according to above (1), wherein dolomite [$CaMg(CO_3)_2$] is used as the calcium source and magnesium source of the calcium zirconate and magnesia to achieve uniform mixing of the calcium and magnesium contained in the starting materials on an atomic level.

(3) A method of producing the porous calcium zirconate/magnesia composites defined in above (1) or (2), comprising:
uniformly crushing and mixing equimolar amounts of dolomite and zirconia powders doped with low-melting-point liquid phase forming material;
molding this mixture as needed; and
sintering the mixture to obtain the porous composites.

(4) A method of producing porous calcium zirconate/ magnesia composites according to above (3), wherein natural dolomite ore of a high purity is used as the starting material and reacted with zirconia during the sintering to form an equimolar calcium zirconate/ magnesia composite structure inexpensively and in a short time.

(5) A method of producing porous calcium zirconate/ magnesia composites according to above (3), wherein the composites having a 3-dimensional network structure and high strength even though having a porosity of 40 to 60% are synthesized by using reactive sintering which comprises uniformly mixing equimolar amounts of dolomite and zirconia [$ZrO_2$] with 0.5 to 2.0 wt % low-melting-point liquid phase forming material per the total amount of dolomite and zirconia, molding the mixture as needed, heating the mixture to promote intergranular dispersion via the formation of a liquid phase at a relatively low temperature (500 to 700° C.), thereby forming strong necks between the dolomite and zirconia during the process of pyrolysis of the dolomite, liberating $CO_2$ during the course of the subsequent rise in temperature, and sintering the mixture in atmosphere at 1,300 to 1,400° C. to obtain the porous composites.

(6) A method of producing porous calcium zirconate/ magnesia composites according to above (3), wherein an alkali fluoride selected from LiF or NaF is used as the low-melting-point liquid phase forming material.

The porous calcium zirconate/magnesia composites of the present invention are characterized in that they are sintered compacts having a fine composite structure with good stability at high temperatures due to uniformly dispersed equimolar amounts of both calcium zirconate [$CaZrO_3$] and magnesia [MgO] and controlled grain growth.

The above-mentioned porous calcium zirconate/magnesia composites are produced by the process of uniformly mixing equimolar amounts of dolomite and zirconia [$ZrO_2$] doped with 0.5 to 2.0 wt % low-melting-point liquid phase forming material per the total amount of dolomite and zirconia using natural dolomite ore of a high purity as the starting material, molding the mixture as needed, heating the mixture to promote intergranular dispersion via the formation of a liquid phase at a relatively low temperature (500 to 700° C.) and thereby forming strong necks between the dolomite (or calcium carbonate and magnesium, as its primary decomposition products) and zirconia during the process of pyrolysis of the dolomite, liberating $CO_2$ during the course of the subsequent rise in temperature, and sintering the mixture in air at 1,300 to 1,400° C. to obtain the porous composites.

By using this process, it is possible to realize an equimolar calcium zirconate/magnesia composite structure inexpensively and in a short time and to realize a 3-dimensional network structure that is very strong even though it has a porosity of 40 to 60%. Moreover, since the LiF or NaF used as the low-melting-point liquid phase forming material is gasified through the open pores during the sintering process, there is a reduction in the amount that remains in the sintered compact and therefore, there are no detrimental effects on high-temperature properties.

Aspects of the present invention will be described in detail below.

The porous calcium zirconate/magnesia composites of the present invention have a fine composite structure due to uniformly dispersed equimolar amounts of both calcium zirconate and magnesia and controlled grain growth, and they retain a stable structure, even with long-term use under high temperatures, because grain growth of both the calcium zirconate and magnesia is controlled. Crystal particle diameter of calcium zirconate and magnesia does change somewhat depending on the sintering temperature, but because the composites have a 3-dimensional network structure, the mass transfer that is seen with bulk compacts rarely occurs and fine crystal particles of several microns or smaller are obtained. Almost all of the pores are homogeneous open through-pores and porosity is 40 to 60%, sufficient for selective permeation of fluids.

Individual calcium and magnesium sources are not used as the starting material. Dolomite (compound carbonate of calcium and magnesium) in which they are uniformly dispersed on a molecular level is used and therefore, there is extremely uniform dispersion of calcium and magnesium throughout the entire porous compact.

Moreover, the alkali fluoride added as the low-melting-point liquid phase forming material is released to outside the system through open pores and therefore, there is a reduction in the amount that remains in the porous compact and there is no deterioration of high-temperature properties. Necking of constituent ceramic particles occurs at a relatively low temperature because the low-melting-point liquid phase forming material has been added and therefore, mechanical strength is excellent and selective permeation of fluids with good efficiency is possible. Moreover, the porous compact of the present invention is extremely useful, even for other uses as a porous compact (for instance, lightweight members used at super-high temperatures, catalyst carriers, insulation, or sound-absorbing materials).

Ideally, natural dolomite of a high purity and synthetic zirconia of a high purity (or natural zirconia of a high purity is also possible) are used as the starting materials for the porous compact and LiF or NaF are used as the low-melting-point liquid phase forming material. It is of course possible to use synthetic dolomite as the starting material, but because it is possible to obtain inexpensive ore at a very high purity from specific places of origin, the use of natural dolomite of a high purity is ideal for realizing low cost. Commercial synthetic zirconia of high quality and high purity can be relatively inexpensively obtained and therefore, synthetic products are preferred. LiF or NaF is used as the low-melting-point liquid phase forming material, but the same results can be expected with fluorides of bivalent metals, such as $CaF_2$, $SrF_2$, $BaF_2$, and the like. There will be a reduction in properties at high temperatures and there will also be detrimental effects on the sintering furnace if a large amount of low-melting-point liquid phase forming material remains in the sintered body and therefore, a small amount is preferred. It is possible to promote neck formation at a sufficiently low temperature (500 to 700° C.) with a relatively small amount of 0.5 to 2.0% of the liquid phase forming material in the present invention.

Next, the method of producing the porous calcium zirconate/magnesia composites of the present invention will be described.

The porous composites of the present invention are produced by uniformly crushing and mixing equimolar amounts of dolomite and zirconia with 0.5 to 2.0 wt % low-melting-point liquid phase forming material additive per the total amount of dolomite and zirconia, and sintering the mixture in air. Pyrolysis of the dolomite, neck formation by the low-melting-point liquid phase forming material, formation of calcium zirconate by dominant reaction between the calcia [CaO], which is a decomposition product of dolomite, and zirconia, and evaporation of the low-melting-point liquid phase forming material occur during this sintering process. The method of the present invention is particularly effective in lowering cost because this type of complex process can be realized by simple heat treatment in just one step.

The dolomite can be coarser particles than the zirconia because a fine decomposition product nanometers in size is made during pyrolysis. However, fragmentation of the dolomite is an effective way of realizing a uniform reaction with the zirconia and the use of a high-energy process, such as a planetary ball-mill, vibrating ball-mill, attriting ball-mill, and the like are preferred as the mixing and crushing method.

Sintering can be performed in an ordinary furnace with an air atmosphere. It is also possible to recover the gas that is generated by setting up an appropriate $CO_2$ trap so that there are no detrimental effects on the environment.

The porous calcium zirconate/magnesia composites of the present invention that are obtained in this way have a fine composite structure that remains stable under high temperatures due to uniformly dispersed equimolar amounts of both calcium zirconate and magnesia and controlled grain growth, and therefore, the above-mentioned improved properties of porous compacts are realized.

DESCRIPTION OF THE PREFERRED EMBODIMENTS

Figure 1:
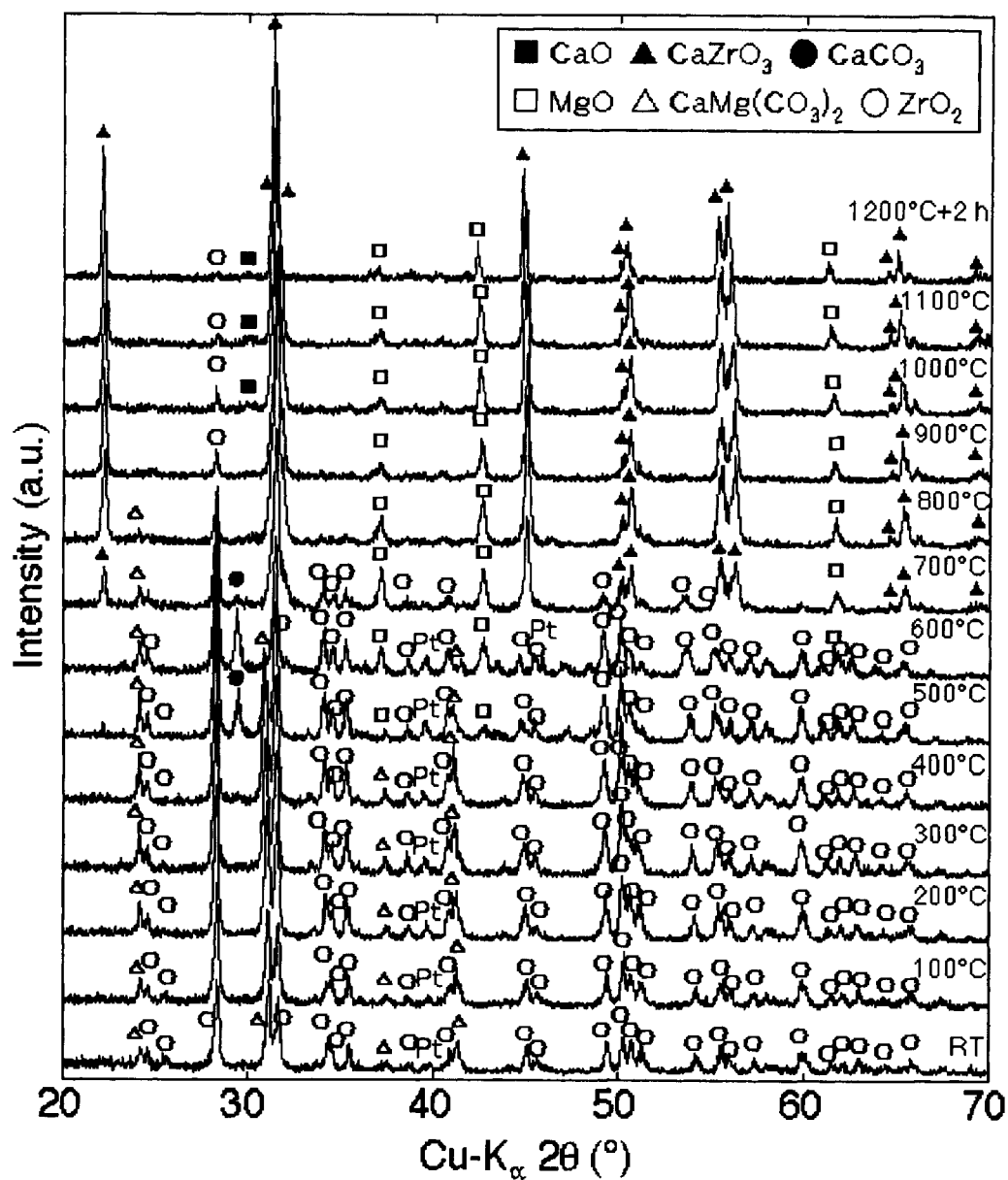
FIG. 1 shows high-temperature XRD patterns for the equimolar $CaMg(CO_3)_2/ZrO_2$ mixed powder doped with 0.5 wt % LiF.

The present invention will be described in specific terms below based on an example. However, the following example is for describing preferred embodiments of the present invention and the scope of the present invention is in no way limited by this example.

In this example, we have attempted to synthesize new porous $CaZrO_3/MgO$ composites with three-dimensional network structure via reactive pressureless sintering of highly-pure mixtures of natural dolomite and synthesized zirconia powders with LiF additive. The bulk porous composites have homogeneous microstructure, narrow pore-size distribution and strong necks between particles. Reaction behavior, microstructure and pore structure of the porous composites will be described.

(1) Preparation of Porous Compact Starting Materials

As natural dolomite, natural Thailand dolomite ore of high purity was used in the present example. The dolomite ore was pulverized and sieved through a 200-mesh sieve to make dolomite powder. This dolomite powder has a theoretical Ca, Mg ratio (atomic ratio) of approximately 1:1 and contains very little impurities, such as iron, and the like, The wt % of constituent elements of this powder are shown below:

Ca: 21.3%, Mg: 12.7%, Si: <0.03%, Fe: 0.020%, Al: 0.0068%, Mn: 0.0035%, Cl: 0.0021%, K: 0.0013%, ($CO_3$): 65.9%

The equimolar amount of commercial zirconia powder of a high purity (with a particle diameter of 0.3 microns) was added to this dolomite powder and then LiF was added at 0.5 wt % per the total amount of dolomite and zirconia (Approximately the same results are seen when NaF was used, and therefore, the case using LiF will be described in this example.). Alcohol was added to these powders as the dispersion medium and the mixture was wet-ball milled by using high-energy planetary ball-mill process for 6 hours under 6 G using zirconia container and zirconia balls. The mixed slurry was dried, subsequently treated with a dry ball-mill, and then was sieved through a 100-mesh screen to obtain the starting material. The dolomite contained in the starting material had been crushed up to 1 micron.

(2) Molding of the Material

A uniaxial molded material was obtained by pre-molding the starting material with a mold. This was sealed under reduced pressure in a plastic film bag and then cold isostatically pressed (pressure : 200 MPa) to obtain the green compact (15 mm in diameter and ~5 mm in thickness).

(3) Heat Treatment

The green compact was placed in a sintering furnace and heat treated at normal pressure in air at 1,100~1,400° C., for 2 hours to obtain the porous composites.

Sample porous compacts were obtained by the above-mentioned process.

(4) Analysis of the Reaction Behavior of the Mixed Powder

The reaction behavior of the mixed powder was studied by in situ high-temperature X-ray diffraction (HT-XRD) in an X-ray diffractometer (SCINTAG, X1 system) with a vertical-type goniometer, a Si solid-state detector, and a Peltier refrigerator. A Pt direct heating stage (10 mm×50 mm×0.15 mm) was used. XRD patterns of the mixed powder were acquired using Cu—K$\alpha$ radiation operated at 45 kV and 40 mA in the range between room temperature and 1200° C. in air.

(5) Characterization of the Bulk Porous Composites

Constituent phases of the sintered composite were analyzed by an X-ray rotating anode diffractometer (Model Rotaflex, Rigaku, Tokyo, Japan), Cu—K$\alpha$ at 50 kV and 150 mA. The microstructure of the composite was characterized using a scanning electron microscope (SEM, Model 6330F, JEOL, Tokyo, Japan).

The porosity and the pore-size distribution of the porous composites were determined by mercury porosimetry (Poresizer 9320, Micromeritics, Norcross, Ga). Mercury intrusion was carried out at pressures between 0 to 207 MPa. Cylindrical pore model was used for the calculation of the total pore volume ($V_p$), specific surface area ($S_p$), median pore diameter (D=4 $V_p/S_p$) and porosity (P). Specific surface area was also evaluated via the $N_2$ gas adsorption method using BET theory (Belsorp 36, Bel Japan Inc., Osaka, Japan).

(6) In Situ XRD Analysis of the Mixed Powder

High-temperature XRD patterns for the equimolar CaMg $(CO_3)_2/ZrO_2$ mixed powder doped with 0.5 wt % LiF are shown in FIG. 1. $CaMg(CO_3)_2$ began to decompose at ~500° C. to form $CaCO_3$ and MgO, following the reaction (1), viz., "half decomposition [6],"

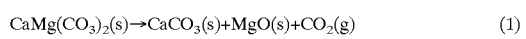
$$CaMg(CO_3)_2(s) \rightarrow CaCO_3(s) + MgO(s) + CO_2(g) \qquad (1)$$

At 700° C., $CaCO_3$ then started to react with $ZrO_2$ to form $CaZrO_3$,

$$CaCO_3(s) + ZrO_2(s) \rightarrow CaZrO_3(s) + CO_2(g) \qquad (2)$$

At>900° C., some remnant $CaCO_3$ decomposed to give a small amount of CaO, but then also reacts with $ZrO_2$ to form $CaZrO_3$. At>1100° C., the whole reaction is substantially completed.

The $CaZrO_3$ formation temperature in this study was ~200–300° C., presumably because (1) the high-energy ball milling process in this study increased the reactivity (i.e. mechanical grinding effect), and (2) the liquid phase via LiF doping enhanced the particle rearrangement and the diffusion.

In addition, the added LiF lowered the initial decomposition temperature of dolomite, similarly to the LiF-doped $CaCO_3$ case. LiF forms a eutectic liquid at ~600° C., similarly to the LiF-doped MgO case. When LiF was added to MgO, liquid was believed to appear at ~600° C., although LiF itself melts at 842° C.; this was attributable to LiF reactions with hydroxides and carbonate adsorbed on the MgO particle surfaces. Because $CaCO_3$ and undecomposed $CaMg(CO_3)_2$ particles were surrounded by the liquid, the liberated $CO_2$ gas in reaction (1) could not fully escape from powder compact, which may result in the increase in $CO_2$ partial pressure. Thus, the decomposition was governed by the "half decomposition" mechanism, in contrast to the single-step-decomposition (i.e. $CaMg(CO_3)_2(s) \rightarrow CaO(s) + MgO(s) + 2CO_2(g)$), which occurred in the vacuum HT-XRD without LiF doping. Throughout, the lines of the XRD patterns are noticeably sharp caused by "mineralization" action of the LiF.

(7) Phase Analysis and Microstructure of the Porous Composites

Figure 2:
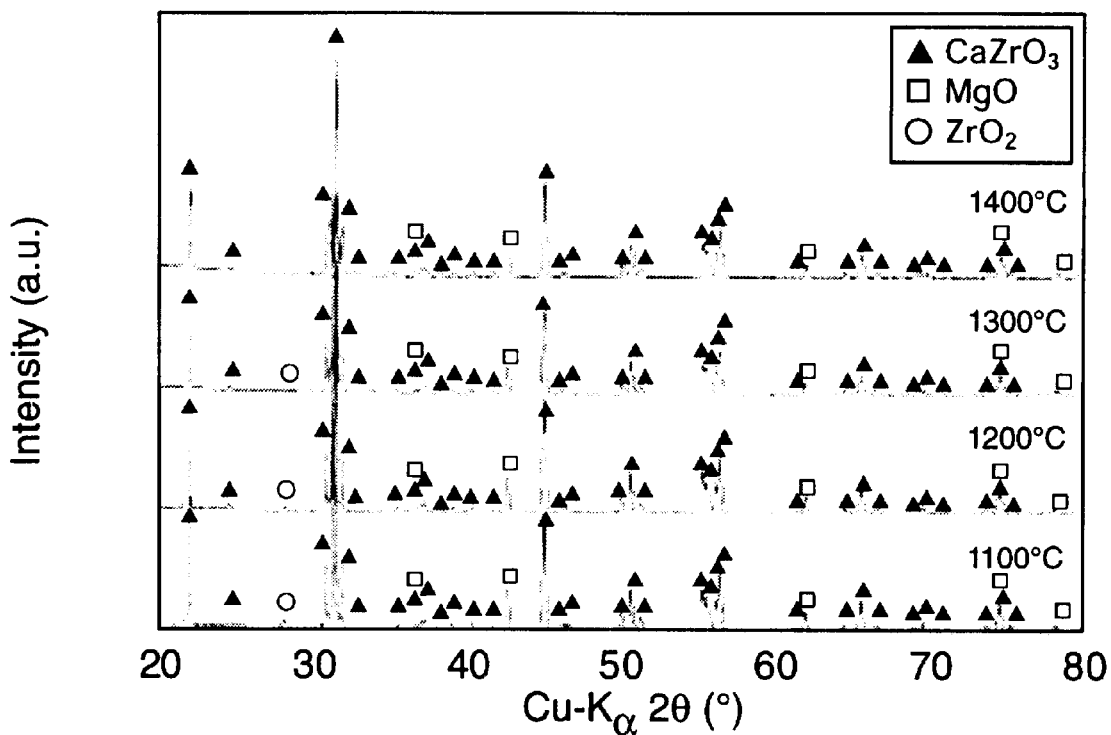
FIG. 2 shows constituent phases of the bulk porous composites.

Constituent phases of the bulk porous composites are shown in FIG. 2. The porous composites sintered at 1100–1300° C. consisted of $CaZrO_3$, MgO and a very small amount of $ZrO_2$. The composite sintered at 1400° C. was composed of only $CaZrO_3$ and MgO.

(8) Properties of Porous Compact

Figure 3:
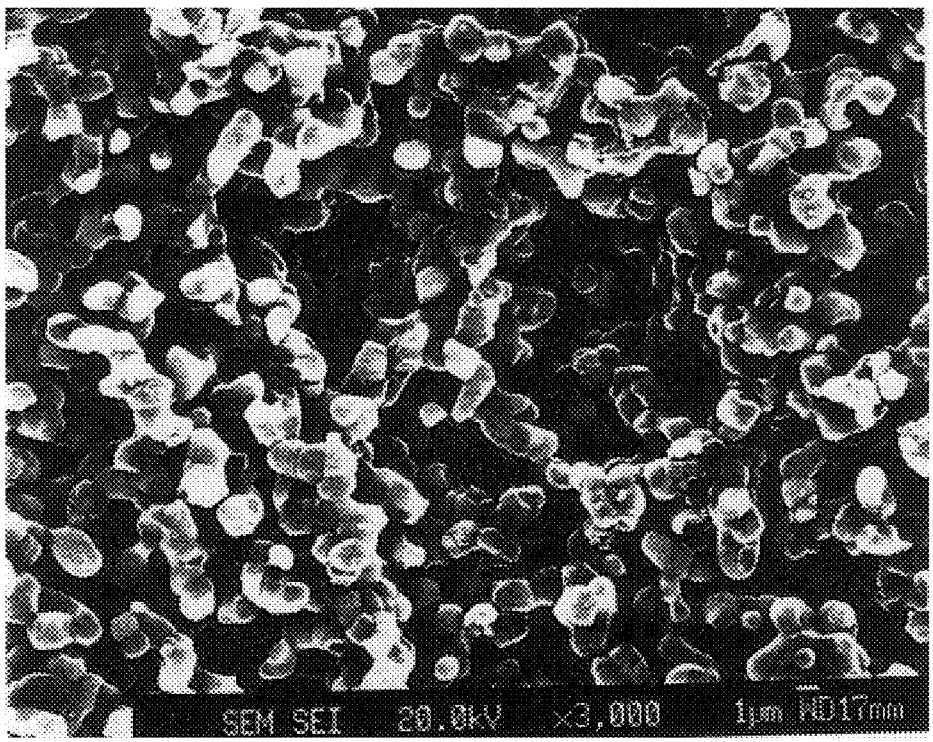
FIG. 3 shows a scanning electron micrograph for a drawing of the microstructure of the porous compact.

Porosity of the porous compact material thus obtained is approximately 50%, and has good porosity. Structure of this porous compact is shown in FIG. 3. FIG. 3 shows typical SEM micrograph of the bulk porous composites. The particles of bright contrast in the Figure are calcium zirconate and the particles of dark contrast are magnesia. It is clear that each has a particle diameter of approximately 1 micron and that a 3-dimensional network is formed where they join with one another. It is obvious that the pores are all homogeneous open pores and have a continuous structure suitable for fluid permeation. When constituent phases of this porous compact were studied using X-ray diffraction, only calcium zirconate and magnesia were identified. Moreover, X-ray diffraction analysis and EDS analysis for LiF remnant were performed, but it was below the lower detection limit in both cases. The same was true when a relatively large amount at 2.0 wt % LiF was added, confirming that the LiF evaporates to outside the porous compact so that the amount of remaining LiF is reduced.

(9) Pore Structure of the Porous Composites

Figure 4:
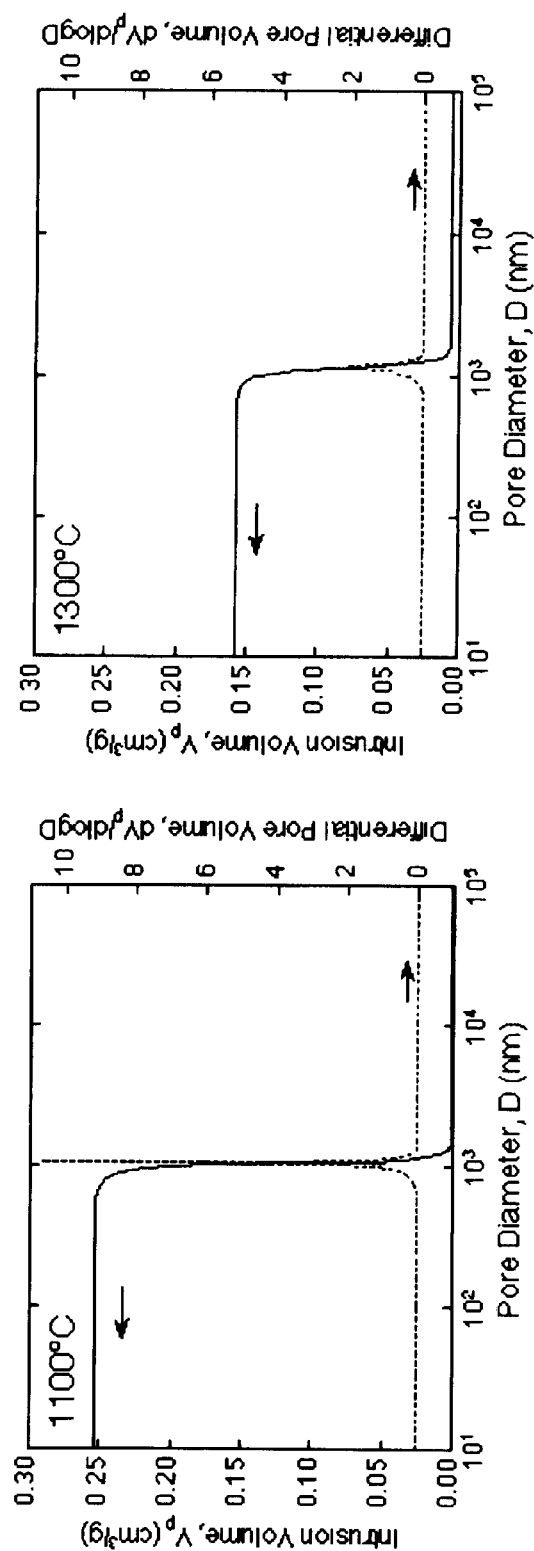
FIG. 4 shows the total pore volume and pore size distribution of the porous composites evaluated by mercury porosimetry.

The total pore volume and the pore size distribution of the porous composites evaluated by mercury porosimetry are shown in FIG. 4. All the composites had very narrow pore size distribution with mean size of ~1 μm, in good agreement with the SEM observation. As the sintering temperature increased, the total pore volume decreased and the distribution slightly shifted to larger size.

Table I summarizes the pore structure of the porous composites with different sintering temperature. Two sets of specific surface area that were determined by mercury porosimetry and $N_2$ gas adsorption method are in good agreement with each other. The porosity of the porous composites varied from ~30 to ~50%, acceptable values for the use of gas filter materials at high temperatures. It is expected that the porosity is controllable by changing LiF content, ball-milling conditions, sintering time, etc.

TABLE I

Pore Structure of the LIF-doped $CaZrO_3$/MgO bulk porous composites.

| Sintering Temperature (° C.) | Total pore Volume $V_p$ (cm³/g) | Specific surface area[a] $S_p$ (m²/g) | Specific surface area[b] $S_{BET}$ (m²/g) | Median pore diameter[c] D (μm) | Porosity[d] p (%) |
|---|---|---|---|---|---|
| 1100 | 0.254 | 0.99 | (0.8) | 1.0 | 52 |
| 1200 | 0.177 | 0.62 | (0.5) | 1.1 | 43 |
| 1300 | 0.151 | 0.54 | (0.6) | 1.1 | 40 |
| 1400 | 0.107 | 0.35 | (0.4) | 1.2 | 31 |

[a] Determined by mercury porosimetry,
[b] Determined by $N_2$ adsorption method,
[c] $D = 4 V_p/S_p$, d) $p = 100 \times V_p \times$ (Sample mass)/(Sample volume)

This porous compact has a 3-point bending strength (span of 30 mm) of 30 MPa or greater, indicating that it has superior mechanical strength. There was almost no change in composition, even with long-term heat treatment at 1,000° C., indicating that this porous compact has extremely excellent heat resistance. Moreover, because it is an oxide, it has excellent oxidation resistance and because it is comprised of only calcium zirconate and magnesia, it has excellent alkali resistance.

As previously discussed in detail, the present invention relates to porous calcium zirconate/magnesia composites having a thermally and chemically stable porous structure, characterized in that they are sintered compacts having a fine composite structure with good stability at high temperatures due to uniformly dispersed equimolar amounts of both calcium zirconate [$CaZrO_3$] and magnesia [MgO] and controlled grain growth, and a method of producing the same. By means of the porous calcium zirconate/magnesia composites of the present invention, a porous structure that is controlled to a very high degree and that is stable thermally and chemically is realized, even though a simple process is employed using natural starting materials. The present invention is useful as, for instance, highly corrosion resistant materials that function as fluid-permeable filters, lightweight members used at super-high temperatures, catalyst carriers, insulation, sound-absorbing materials, and the like. Moreover, the present invention is advantageous in terms of cost when compared to conventional methods and diverse engineering applications are therefore possible.

What is claimed is:

1. Porous calcium zirconate/magnesia composites having a thermally and chemically stable porous structure,
    said porous composites consist of sintered compacts having a composite structure of uniformly dispersed equimolar amounts of calcium zirconate, $CaZrO_3$, and magnesia, MgO,
    which are synthesized by using reactive sintering of equimolar mixture of dolomite and zirconia powders doped with liquid phase forming material.

2. Porous calcium zirconate/magnesia composites according to claim 1, wherein dolomite $CaMg(CO_3)_2$, is used as the calcium source and magnesium source of the calcium zirconate and magnesia to achieve uniform mixing of the calcium and magnesium contained in the starting materials on an atomic level.

3. A method of producing the porous calcium zirconate/magnesia composites defined in claim 1 or 2, comprising:
    uniformly crushing and mixing equimolar amounts of dolomite and zirconia powders doped with a liquid phase forming material;
    molding the mixture; and
    sintering the mixture to obtain the porous composites.

4. A method of producing porous calcium zirconate/magnesia composites according to claim 3, wherein natural dolomite ore is used as the starting material and reacted with zirconia during the sintering to form an equimolar calcium zirconate/magnesia composite structure.

5. A method of producing porous calcium zirconate/magnesia composites according to claim 3, wherein the composites having a 3-dimensional network structure and having a porosity of 40 to 60% are synthesized by using reactive sintering which comprises uniformly mixing equimolar amounts of dolomite and zirconia, $ZrO_2$, with 0.5 to 2.0 wt % liquid phase forming material per the total amount of dolomite and zirconia, molding the mixture, heating the mixture to promote intergranular dispersion via the formation of a liquid phase at a temperature of 500 to 700° C., thereby forming necks between the dolomite and zirconia during the process of pyrolysis of the dolomite, liberating $CO_2$ during the course of the subsequent rise in temperature, and sintering the mixture in atmosphere at 1,300 to 1,400° C. to obtain the porous composites.

6. A method of producing porous calcium zirconate/magnesia composites according to claim 3, wherein an alkali fluoride selected from LiF or NaF is used as the liquid phase forming material.

* * * * *